Figure 1:
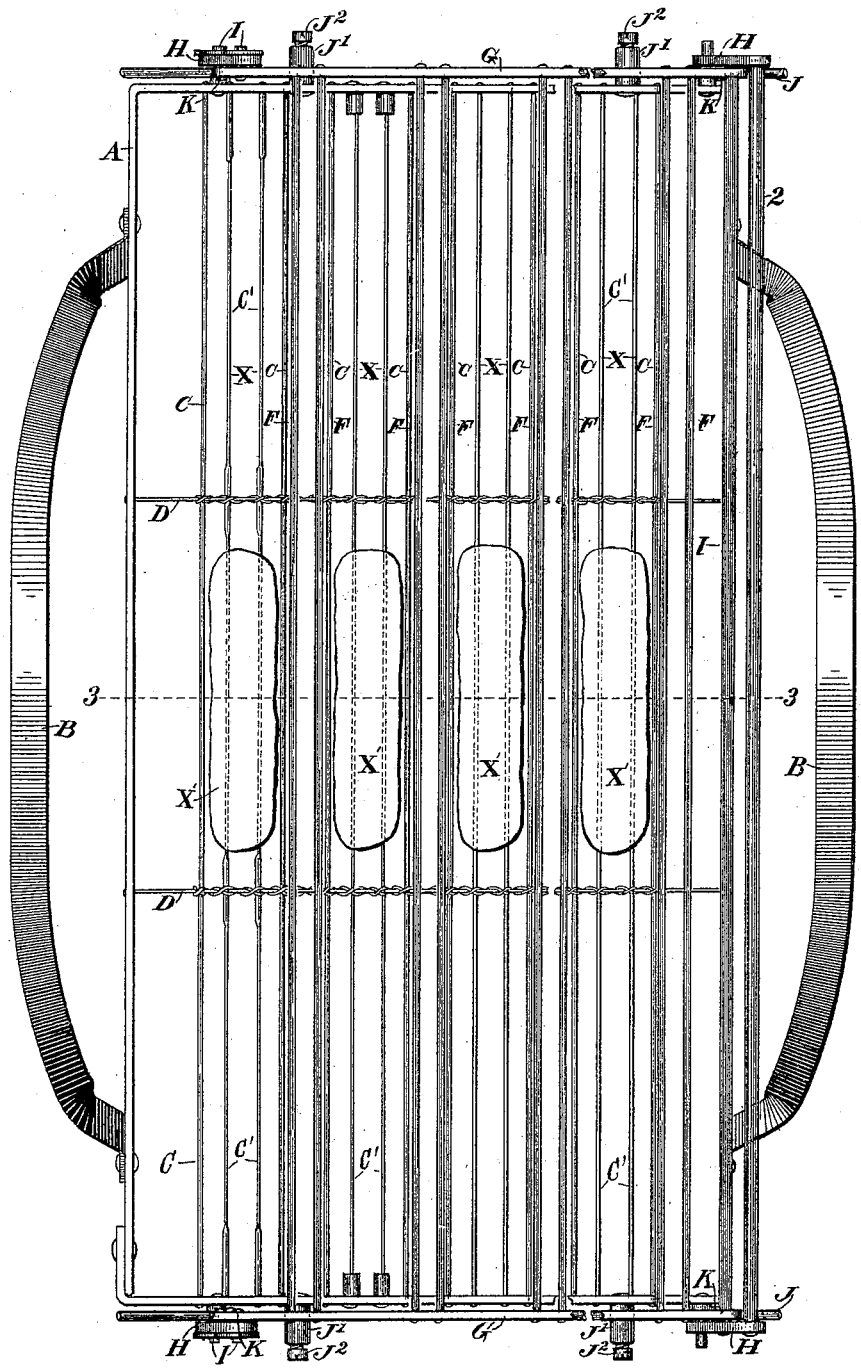

No. 611,987. Patented Oct. 4, 1898.
L. J. ANGER.
CONFECTION DIPPING TRAY.
(Application filed Mar. 24, 1898.)

(No Model.) 2 Sheets—Sheet 2.

Witness
Geo. B. Rowley.
M. V. Bidgood

Inventor:
Louis J. Anger
By his Attorneys

UNITED STATES PATENT OFFICE.

LOUIS J. ANGER, OF NEW YORK, N. Y., ASSIGNOR TO HAWLEY & HOOPS, OF SAME PLACE.

CONFECTION-DIPPING TRAY.

SPECIFICATION forming part of Letters Patent No. 611,987, dated October 4, 1898.

Application filed March 24, 1898. Serial No. 674,989. (No model.)

*To all whom it may concern:*

Be it known that I, LOUIS J. ANGER, a citizen of the United States, residing in the city of New York, in the county and State of New York, have invented certain new and useful Improvements in Confection-Dipping Trays, of which the following is a specification.

The object of my invention is to provide an improved and simplified form of dipping-tray and of the skeleton covering-frame therefor usually employed in coating confections with chocolate or other coating solutions.

To this end my invention consists of a confection-dipping tray having a series of longitudinal wires arranged in sets of four wires each. In each set the two intermediate wires have an elongated dip to receive a slug or block of "cream." The longitudinal wires are fastened to the ends of a frame and are braced at intermediate points by cross-wires.

The invention further consists in the combination, with the dipping-tray, of a rocking skeleton covering-frame supported above the dipping-tray and adapted to be rocked from the position in which the pockets are covered to a position in which the pockets are open or free to allow the removal of the coated confections.

The skeleton covering-frame comprises, preferably, two end bars or frame-pieces mounted upon parallel links, which are journaled upon suitable lugs at the opposite ends of the dipping-tray. Extending between the end bars or frame-pieces of the covering-frame are a series of pairs of rods or bars which in the covered position of the frame rest directly above the openings to the skeleton confection-receiving pockets for the purpose of holding the confections therein while being coated. Any suitable handle may be provided for rocking the covering-frame from covered to uncovered position; but I prefer to form extensions upon one of the parallel links at each end of the dipping-tray and mount an operating handle bar or rod between these extensions. This operating handle bar or rod is preferably in convenient relation with one of the ordinary handles of the dipping-tray. To hold the covering-frame in the desired position, I provide at one or both ends of the dipping-tray a suitable spring device, preferably in the form of a spring-rod attached between its ends to the end of the dipping-tray and having its ends engage lugs or projections formed on the parallel links.

In order that my invention may be fully understood, I will first describe the same with reference to the accompanying drawings and afterward point out the novelty with more particularity in the annexed claims.

Figure 2:
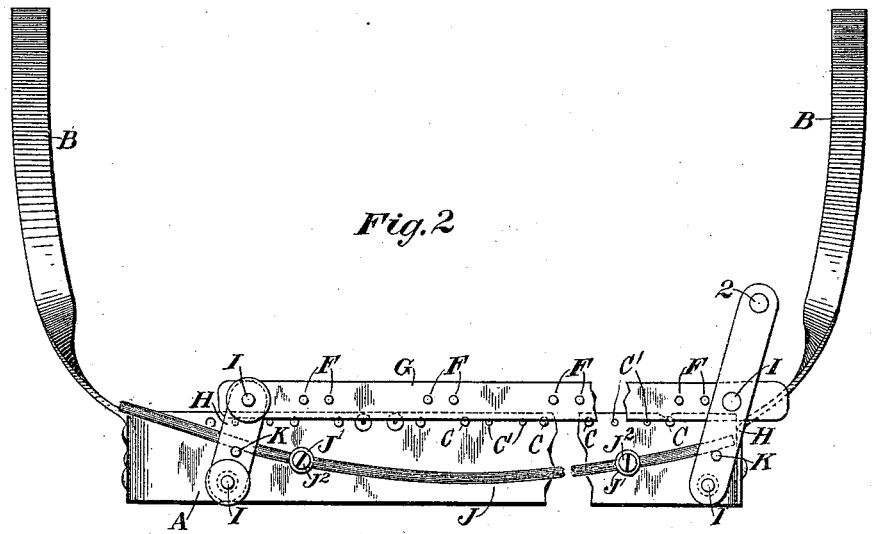
Figure 3:
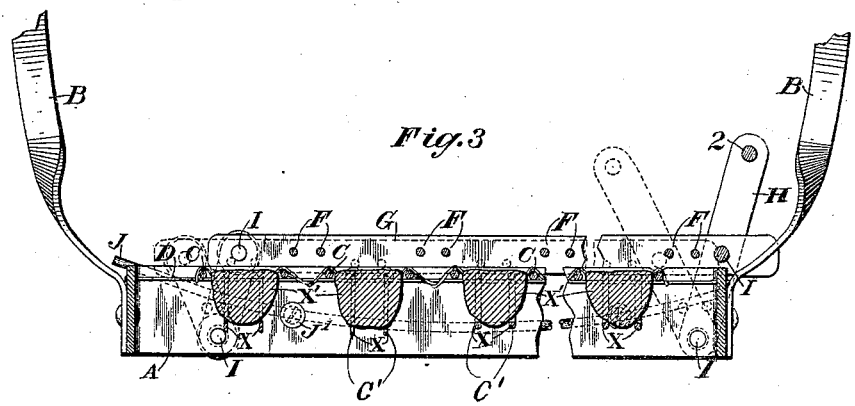
Figure 4:
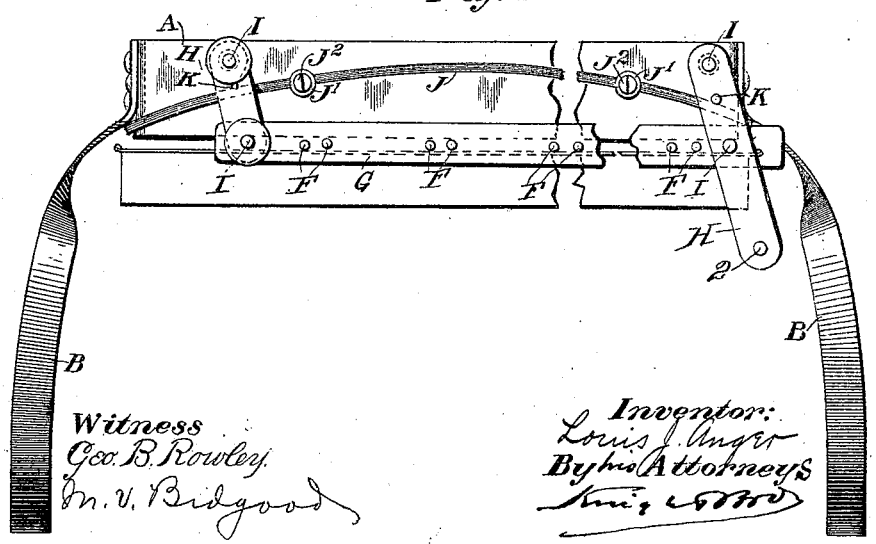

In said drawings, Figure 1 is a plan view of my confection-dipping tray having the skeleton covering-frame applied thereto. Fig. 2 is an end elevation of the same. Fig. 3 is a transverse sectional view taken on the line 3 3 of Fig. 1. Fig. 4 is an end elevation of the dipping-tray, representing it in inverted position with the skeleton covering-frame shifted into position to cover the confection-pockets and prevent the confections from dropping out until the tray is in proper position above the table or other support.

The dipping-frame proper consists, preferably, of a rectangular sheet-metal frame A, provided with sheet-metal handles B, a series of longitudinal rods or wires C C', and transverse rods or wires D, connected with the longitudinal rods at the points of intersection. The longitudinal rods C C' are arranged in sets of four each, the two intermediate rods or wires C' of each set being dipped, as shown at X in Fig. 3, to provide an elongated pocket for slugs or blocks X' of cream. The cross-wires D are connected to the wires or rods C' at the elevated portion between the dips X therein, as shown in Fig. 1.

By reference to Fig. 3 it will be seen that by forming the creams X' with slightly-converging bottoms they will seat themselves on the dipping portions X X of the wires centrally between wires C and will be fully sustained by the portions X without coming in contact with the wires C. There is thus a space left all around for the free flow of chocolate while the block is supported steadily in place.

Supported above the dipping-frame is a skeleton covering-frame formed of a series of pairs of longitudinal wires F, attached at their ends to end bars or frame-pieces G. The end frame-pieces G are journaled upon the parallel links H, which are in turn journaled at their lower ends upon lugs I, extending from the ends of the dipping-frame. At each end of the dipping-frame is mounted a strong spring-wire J, which passes through openings in lugs J' and is secured by screws J². The ends of wires J pass over and engage lugs K, projecting inwardly from the parallel links H, to yieldingly hold the rocking covering-frame in either of its extreme positions, the lugs sliding on the springs when the frame is rocked from one position to the other. Two of the links H are extended upwardly from the covering-frame and are connected by a bar 2, by which the covering-frame is operated.

In dipping confections with my improved dipping-tray the confections X' are placed in the pockets X of the dipping-frame, and the covering-frame is rocked to one side to bring the pairs of covering-wires F directly above the pockets for holding the confections in place. The confections are then dipped and the tray withdrawn and shaken to remove the superfluous chocolate or other covering solution. The covering-frame is then shifted from position shown in dotted lines in Fig. 3 to position shown in full lines in said figure to uncover the confections. In this movement the covering-frame is raised slightly from the dipping-tray. The usual sheet of paper and sheet-metal plate (not shown) are placed upon the covering-frame above the pockets and the tray is inverted above the table or support M in the usual manner, as shown in Fig. 4, and the confections thereby deposited.

Having thus described my invention, what I claim as new therein, and desire to secure by Letters Patent, is—

1. A confection-dipping tray having confection-dipping pockets, in combination with a rocking skeleton covering-frame, and means for supporting and attaching the covering-frame upon the dipping-tray, constructed and arranged to move the covering-frame into position above the pockets or to one side of the pockets, and, in moving from covering position to uncovering position, raise the covering-frame away from the dipping-tray; substantially as and for the purpose set forth.

2. A confection-dipping tray formed with suitable confection-receiving pockets, in combination with a rocking skeleton covering-frame, and parallel links connecting the covering-frame with the dipping-tray, substantially as set forth.

3. A confection-dipping tray formed with suitable confection-receiving pockets, in combination with a rocking skeleton covering-frame, parallel links connecting the covering-frame with the dipping-tray, and an operating-handle on the rocking covering-frame, substantially as set forth.

4. A confection-dipping tray formed with suitable confection-receiving pockets, in combination with a rocking skeleton covering-frame, parallel links journaled to the ends of the dipping-tray and having the skeleton covering-frame journaled to them, and suitable springs mounted upon the dipping-tray and engaging the supporting-links of the covering-frame for holding the frame in the desired position, substantially as set forth.

5. A confection-dipping tray formed with suitable confection-receiving pockets, in combination with a rocking skeleton covering-frame, parallel links journaled at the opposite ends of the dipping-tray and having the covering-frame journaled to them above the dipping-frame, arms forming extensions on one of the parallel links at each end of the dipping-tray, and a bar supported between said extensions and constituting an operating-handle for the rocking covering-frame, substantially as set forth.

6. A confection-dipping tray formed with suitable confection-receiving pockets, in combination with a rocking skeleton covering-frame comprising two end bars or frame-pieces and pairs of rods or bars supported between the end bars or frame-pieces, the rocking covering-frame being mounted to bring the pairs of rods or bars above the confection-receiving pockets in one position of the covering-frame, substantially as set forth.

7. A confection-dipping tray formed with suitable confection-receiving pockets in combination with a rocking skeleton covering-frame supported above the dipping-tray, parallel links journaled to the ends of the dipping-tray, and connecting the covering-frame therewith, a spring wire or rod attached to one end of the dipping-tray at a point or points between the ends of the spring wire or rod, and lugs or projections on the adjacent parallel links engaged by the ends of said spring wire or rod, substantially as set forth.

LOUIS J. ANGER.

Witnesses:
HARRY E. KNIGHT,
M. V. BIDGOOD.